United States Patent
Kifuku et al.

(10) Patent No.: US 7,141,948 B2
(45) Date of Patent: Nov. 28, 2006

(54) ELECTROMOTIVE POWER STEERING SYSTEM

(75) Inventors: Takayuki Kifuku, Tokyo (JP); Hiroyuki Kozuki, Tokyo (JP); Masaki Matsushita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/066,390

(22) Filed: Feb. 28, 2005

(65) Prior Publication Data
US 2006/0043917 A1    Mar. 2, 2006

(30) Foreign Application Priority Data
Aug. 27, 2004   (JP)   ............... 2004-248615

(51) Int. Cl.
*H02P 7/00* (2006.01)
(52) U.S. Cl. .................. 318/432; 318/779; 318/807
(58) Field of Classification Search ............... None
See application file for complete search history.

(56) References Cited

U.S. PATENT DOCUMENTS

| | | | |
|---|---|---|---|
| 4,869,333 A | 9/1989 | Morishita et al. | |
| 6,427,105 B1 | 7/2002 | Matsushita | |
| 6,459,972 B1 * | 10/2002 | Kodaka et al. | 701/43 |
| 6,700,400 B1 * | 3/2004 | Atarashi | 324/772 |
| 6,801,011 B1 * | 10/2004 | Ide | 318/700 |
| 6,906,492 B1 * | 6/2005 | Matsushita | 318/727 |
| 2003/0057913 A1 * | 3/2003 | Matsushita et al. | 318/727 |
| 2003/0222612 A1 * | 12/2003 | Matsushita | 318/437 |

FOREIGN PATENT DOCUMENTS

| | | |
|---|---|---|
| EP | 0 241 853 A3 | 10/1987 |
| EP | 0957572 A | 11/1999 |
| JP | 8-322291 A | 12/1996 |
| JP | 11-332002 | 11/1999 |
| JP | 2001-187578 A | 7/2001 |
| JP | 2004-215390 | 7/2004 |

* cited by examiner

*Primary Examiner*—Paul Ip
(74) *Attorney, Agent, or Firm*—Sughrue Mion, PLLC (57) ABSTRACT

An objective is to provide, in a motor controller used for an electromotive power steering system, a concrete realistic method for easily performing abnormality judgments in its control system. The electromotive power steering system includes: a d-q command value setting unit for determining, for current to be applied to the motor, d-axis and q-axis current command values in a d-q coordinate system; a current detector for detecting a three-phase AC current actually flowing in the motor; a three-phase AC/d-q coordinate transformer for transforming the three-phase AC current detected by the current detector into a d-axis current detection value and a q-axis current detection value in the d-q coordinate system; a voltage controller for controlling a voltage applied to the motor, based on the d-axis current command value and the q-axis current command value, and on the d-axis current detection value and the q-axis current detection value; and an abnormality judging unit for judging, by either comparing the q-axis current command value with the q-axis current detection value, or comparing the d-axis current command value with the d-axis current detection value, whether a system-control abnormality has occurred.

10 Claims, 9 Drawing Sheets

ELECTROMOTIVE POWER STEERING SYSTEM

BACKGROUND OF THE INVENTION

1. Field of the Invention

The present invention relates to motor controllers for electromotive power steering systems that perform power-assisted steering by applying torque generated by a motor to a steering mechanism.

2. Description of the Related Art

An electromotive power steering system has conventionally been known, in which torque generated by a motor such as a three-phase brushless motor is transmitted to a steering mechanism, perform power-assisted steering. See, e.g., Japanese Laid-Open Patent Publication 187,578/2001.

Figure 7:
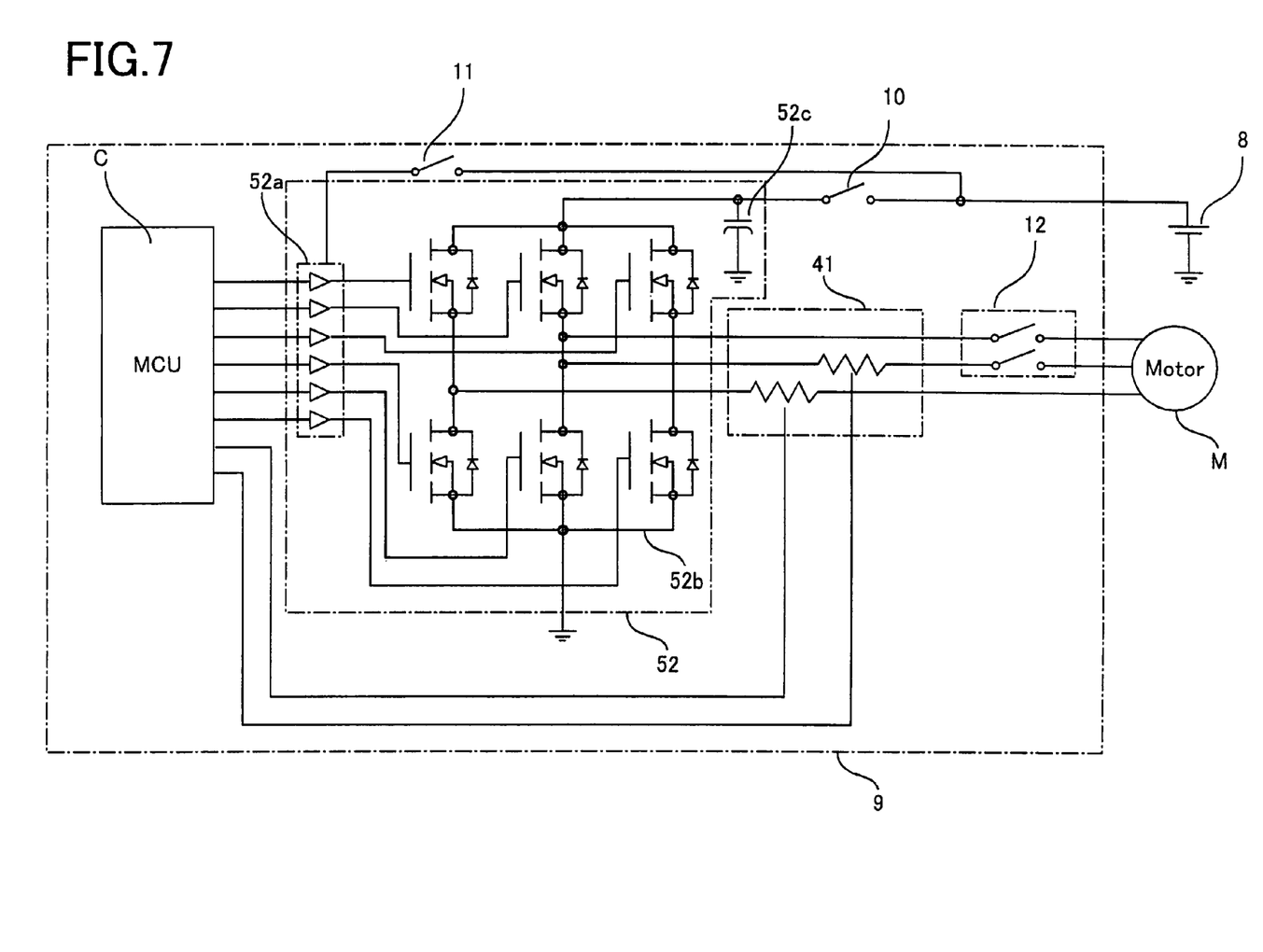
FIG. 7 is a circuit diagram illustrating a configuration of an electromotive power steering system according to an example of the present invention.
Figure 8:
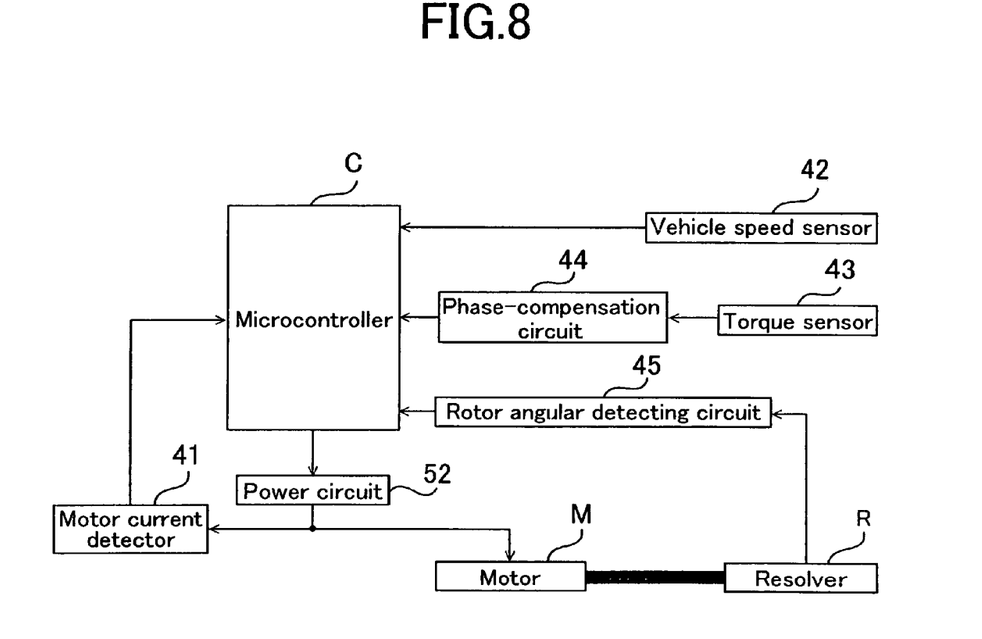
FIG. 8 is a view illustrating relationships between a motor for controlling the electromotive power steering system and a microcontroller for controlling the motor.

Relationships between a motor M for assisting this electromotive power steering system and a microcontroller C for controlling the motor M are illustrated in FIG. 7, and a block diagram representing a functional configuration of a motor controller for a conventional electromotive power steering system is illustrated in FIG. 8.

FIG. 8 represents the relationships among the microcontroller C for controlling the conventional electromotive power steering system, values inputted into the microcontroller C, and the motor M that the microcontroller C controls. The motor M, (not illustrated), assistively supplies torque to the electromotive power steering system, and the motor M is driven by a power circuit 52 that is controlled by the microcontroller C. Here, a vehicle speed V obtained by a vehicle speed sensor 42, steering torque T obtained by a torque sensor 43, and a rotor angle $\theta_{re}$ of the motor M detected by a resolver R connected to the motor M and by a rotor-angle detecting circuit 45 are inputted into the microcontroller C. Moreover, because the motor M is controlled with electric current feedback being applied thereto by the microcomputer C, the electric current (U-phase current $i_{ua}$, V-phase current $i_{va}$) flowing through the motor M, detected by a motor-current detector 41 (a U-phase current detector 41u, a V-phase current detector 41v), is inputted into the microcontroller C.

Figure 9:
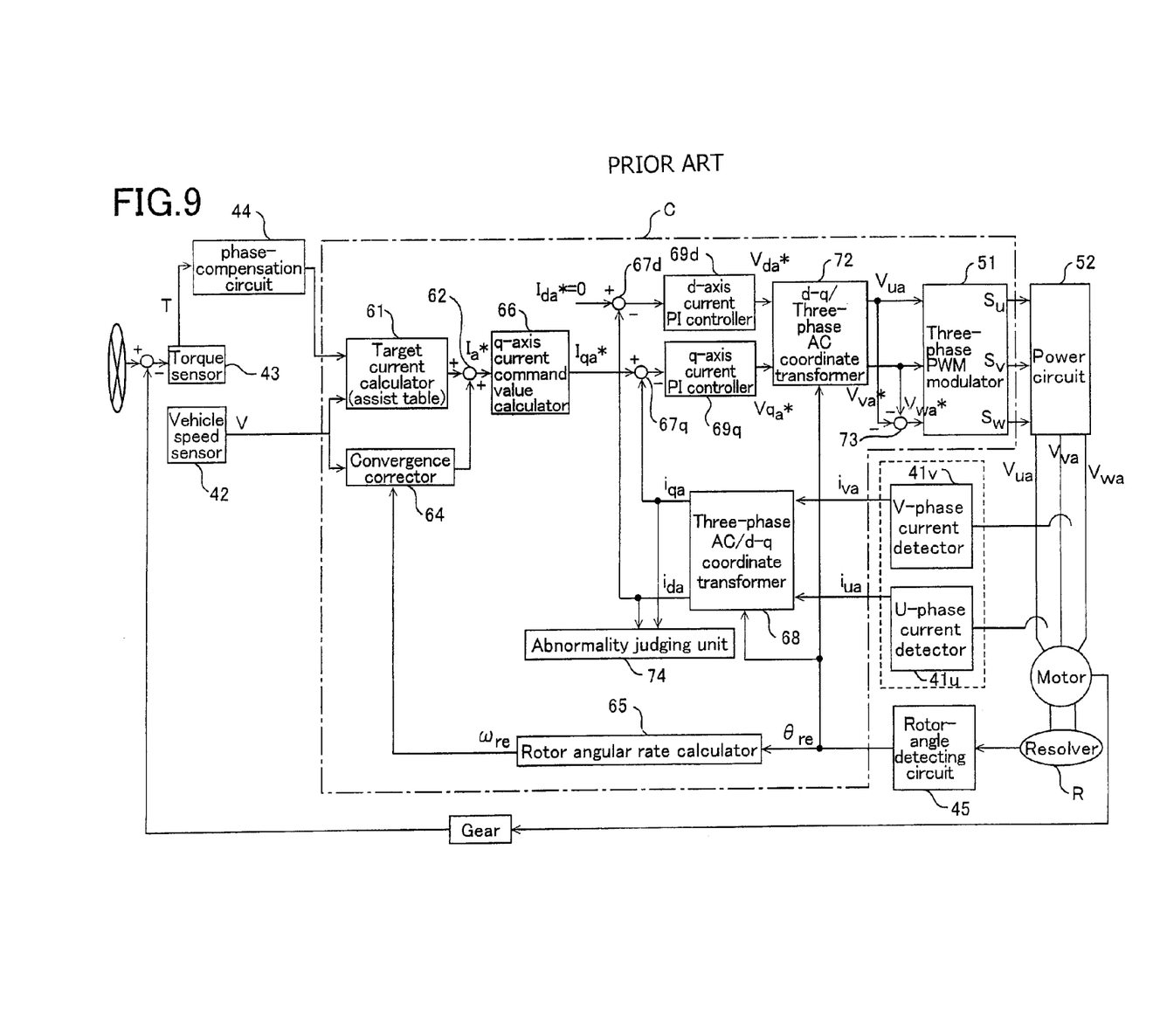
FIG. 9 is a block diagram illustrating a functional configuration of a motor controller used for a conventional electromotive power steering system.

Next, FIG. 9 is explained. In this motor controller, the vehicle speed V detected by the vehicle speed sensor 42 and the steering torque T that has been detected by the torque sensor 43 and phase-compensated through a phase-compensation circuit 44 are inputted into the microcontroller C. Moreover, the motor controller is provided with a target current calculator 61 for determining a target current command value $I_a^{*'}$ (an effective current value flowing through the U-phase, V-phase, and W-phase) by which current is applied to the motor M. In order to improve the steering feel, a convergence correction value $I_{co}^*$, is calculated from the vehicle speed V and a rotor angular rate $\omega_{re}$. $\omega_{re}$ is obtained by a rotor angle $\theta_{re}$ of the motor M, detected by the resolver R and a rotor angular detecting circuit 45, as passed through a rotor angular rate calculator 65. The convergence correction value is given to an adder 62. In the adder 62, the target current command value $I_a^{*'}$ (the effective value), inputted from the target current calculator 61, and the convergence correction value $I_{co}^*$, inputted from convergence corrector 64, are summed, and a convergence-compensated target-current command value $I_a^*$ is set, which represents the amplitude of current (sine wave current) to be applied to the U-phase, V-phase, and W-phase of the motor M. Moreover, in order to enable the current value to be treated as a dc current amount independent from the rotor angle $\theta_{re}$ of the motor M, in a q-axis current command value calculator 66, a q-axis current command value $i_{qa}^*$ is determined with a d-q coordinate conversion being applied to the target current command value $I_a^*$ after the convergence correction has been performed. On the other hand, a d-axis current command value $i_{da}^*$ is set to zero.

The d-axis current command value $i_{da}^*$ and the q-axis current command value $i_{qa}^*$ are inputted into subtractors 67d and 67q, respectively. These subtractors 67d and 67q are constituted so that a d-axis current detection value $i_{da}$ and a q-axis current detection value $i_{qa}$ are given, which are obtained by passing the output from the U-phase current detector 41u for detecting the U-phase current $i_{ua}$ that actually flows in the U-phase of the motor M, and the output from the V-phase current detector 41v for detecting the V-phase current $i_{va}$ that actually flows in the V-phase, through a three-phase AC/d-q coordinate transformer 68. Consequently, from the subtractors 67d and 67q, deviations for the d-axis current command value $i_{da}^*$ and the d-axis current detection value $i_{da}$, and deviations for the q-axis current command value $i_{qa}^*$ and the q-axis current detecting value $i_{qa}$, are outputted, respectively.

The deviations outputted from the subtractors 67d and 67q are applied to a d-axis current PI (proportional integration) controller 69d and a q-axis current PI controller 69q; whereby a d-axis voltage command value $V_{da}^*$ and a q-axis voltage command value $V_{qa}^*$ are obtained, respectively.

The d-axis voltage command value $V_{da}^*$ and q-axis voltage command value $V_{qa}^*$ are inputted into a d-q/three-phase AC coordinate transformer 72. The rotor angle $\theta_{re}$ detected in the rotor angle detecting circuit 45 has been also inputted into this d-q/three-phase AC coordinate transformer 72; therefore, the d-q/three-phase AC coordinate transformer 72 transforms, in accordance with the following equation (1), the d-axis voltage command value $V_{da}^*$ and q-axis voltage command value $V_{qa}^*$ into command values $V_{ua}^*$ and $V_{va}^*$ in the three-phase AC coordinate system, respectively. Then, the U-phase voltage command values $V_{ua}^*$ and V-phase voltage command value $V_{va}^*$ obtained are inputted into a three-phase PWM (pulse width modulation) modulator 51.

$$\begin{bmatrix} V_{va}^* \\ V_{ua}^* \\ V_{wa}^* \end{bmatrix} = [C]^{-1} \begin{bmatrix} V_{da} \\ V_{qa} \end{bmatrix} \qquad (1)$$

$$= \sqrt{\frac{2}{3}} \begin{bmatrix} \cos\theta_{re} & -\sin\theta_{re} \\ \cos\left(\theta_{re} - \frac{2\pi}{3}\right) & -\sin\left(\theta_{re} - \frac{2\pi}{3}\right) \\ \cos\left(\theta_{re} - \frac{4\pi}{3}\right) & -\sin\left(\theta_{re} - \frac{4\pi}{3}\right) \end{bmatrix} \begin{bmatrix} V_{da} \\ V_{qa} \end{bmatrix}$$

However, a W-phase voltage command value $V_{wa}^*$ is not calculated in the d-q/three-phase AC coordinate transformer 72, but rather in a W-phase voltage command value calculator 73, on the basis of the U-phase voltage command value $V_{ua}^*$ and V-phase voltage command value $V_{va}^*$ that have been calculated in the d-q/three-phase AC coordinate transformer 72. That is, in the W-phase voltage command value calculator 73, the U-phase voltage command value $V_{ua}^*$ and V-phase voltage command value $V_{va}^*$ are inputted, and, in the W-phase voltage command value calculator 73, a W-phase voltage command value $V_{wa}^*$ is obtained by subtracting from zero the U-phase voltage command value $V_{ua}^*$ and V-phase voltage command value $V_{va}^*$.

The W-phase voltage command value $V_{wa}^*$ calculated in the W-phase voltage command calculator 73, similarly to the U-phase voltage command value $V_{ua}*$ and V-phase voltage command value $V_{va}*$, is applied to the three-phase PWM modulator 51. The three-phase PWM modulator 51 generates PWM signals Su, Sv, and Sw corresponding to the U-phase voltage command value $V_{ua}*$, V-phase voltage command value $V_{va}*$, and W-phase voltage command value $V_{wa}*$, respectively, and the generated PWM signals Su, Sv, and Sw are outputted to the power circuit 52. Thereby, voltages $V_{ua}$, $V_{va}$, and $V_{wa}$, corresponding to the PWM signals Su, Sv, and Sw, are applied to the U-phase, V-phase, and W-phase, respectively of the motor M, whereby the motor M generates torque required for the power-assisted steering.

Moreover, in the above described prior art, an abnormality judging unit 74 is provided, for judging whether an abnormality such as an offset has occurred. The unit 74 is configured to judge, on the basis of the d-axis current detection value $i_{da}$ and q-axis current detection value $i_{qa}$ outputted from the three-phase AC/d-q coordinate transformer 68, whether an abnormality has occurred. Provided that the U-phase current $i_{ua}$, V-phase current $i_{va}$, and W-phase current $i_{wa}$ each have an amplitude $I_a$, the d-axis current $i_{da}$ and the q-axis current $i_{qa}$ are expressed by the following equation (2), which is understood to be independent of the rotor angle $\theta_{re}$. Therefore, the abnormality judging unit 74 can acquire the d-axis current $i_{da}$ and the q-axis current $i_{qa}$ without regard to the rotor angle $\theta_{re}$, and determine, on the basis of the acquired d-axis current $i_{da}$ and the q-aixis current $i_{qa}$, whether or not an abnormality is present. It is described in this document that the effective value of the current flowing through the motor M also need not be calculated.

$$\begin{bmatrix} i_{da} \\ i_{qa} \end{bmatrix} = \begin{bmatrix} 0 \\ -\sqrt{\frac{3}{2}} I_a \end{bmatrix} \quad (2)$$

However, in the above described prior art, no concrete practical method for the abnormality judgment is described at all. That is, it is not described, for example, which portion of the amplitude $I_a$, the d-axis current detecting value $i_{da}$ and the q-axis current detecting value $i_{qa}$ are used.

Therefore, an objective of the present invention is to provide a concrete practical means for easily performing abnormality judgments in a motor control system for electromotive power steering systems.

SUMMARY OF THE INVENTION

An electromotive power steering system according to a first aspect of the present invention includes: a d-q command value setting unit for determining, for current to be applied to the motor, d-axis and q-axis current command values in a d-q coordinate system; a current detector for detecting a three-phase AC current actually flowing in the motor; a three-phase AC/d-q coordinate transformer for transforming a three-phase AC current detected by the current detector into a d-axis current detection value and a q-axis current detection value in the d-q coordinate system; a voltage controller for controlling a voltage applied to the motor, based on the d-axis current command value and the q-axis current command value determined by the d-q command value setting unit, and on the d-axis current detection value and the q-axis current detection value outputted from the three-phase AC/d-q coordinate transformer; and an abnormality judging unit for judging, by either comparing the q-axis current command value with the q-axis current detection value, or comparing the d-axis current command value with the d-axis current detection value, whether a system-control abnormality has occurred. The abnormality judgments in the control system of the motor controller for the electromotive power steering system can be easily performed.

In an electromotive power steering system according to a second aspect of the present invention, the abnormality judging unit judges that a system-control abnormality has occurred, if either the difference between the q-axis current command value and the q-axis current detection value is equal to or more than a first predetermined value, or the difference between the d-axis current command value and the d-axis current detection value is equal to or more than a second predetermined value; whereby, a time delay to obtain the q-axis current detection value or the d-axis current detection value can be avoided.

In an electromotive power steering system according to a third aspect of the present invention, the abnormality judging unit judges that a system-control abnormality has occurred, if a state in which either the difference between the q-axis current command value and the q-axis current detection value is equal to or more than the first predetermined value, or the difference between the d-axis current command value and the d-axis current detection value is equal to or more than the second predetermined value has continued for a period equal to or more than a predetermined period; therefore, errors such as noise generated in the q-axis current detection value or the d-axis current detection value can be ignored.

In an electromotive power steering system according to a fourth aspect of the present invention, application of current to the motor is shut off if the abnormality judging unit judges that a system-control abnormality has occurred; therefore, abnormal power-assisted steering can be prevented.

In an electromotive power steering system according to a fifth aspect of the present invention, the abnormality judgment is forbidden when the rotational speed of the motor is equal to or higher than a predetermined value; therefore, a wrong judgment due to the effect of induced voltages generated by the motor rotating can be prevented.

An electromotive power steering system according to a sixth aspect of the present invention includes: a d-q command value setting unit for determining, for current to be applied to the motor, d-axis and q-axis current command values in a d-q coordinate system; a current detector for detecting a three-phase AC current actually flowing in the motor; a three-phase AC/d-q coordinate transformer for transforming a three-phase AC current detected by the current detector into a d-axis current detection value and a q-axis current detection value in the d-q coordinate system; a voltage controller for controlling a voltage applied to the motor, based on the d-axis current command value and the q-axis current command value determined by the d-q command value setting unit, and on the d-axis current detection value and the q-axis current detection value outputted from the three-phase AC/d-q coordinate transformer; a composed-vector command value calculator for calculating a composed-vector command value by the vector-composition of the q-axis current command value and the d-axis current command value; a composed-vector detection value calculator for calculating a detection value by the vector-composition of the q-axis current detection value and the d-axis current detection value; and an abnormality judging unit for judging, by comparing the composed-vector command value with the composed-vector detection value, whether a system-control abnormality has occurred. The abnormality judgments in the control system of the motor controller for the electromotive power steering system can be easily performed.

In an electromotive power steering system according to a seventh aspect of the present invention, the abnormality judging unit judges that a system-control abnormality has occurred if the difference between the composed-vector command value and the composed-vector detection value is equal to or more than a predetermined value; therefore, a time delay to obtain the q-axis current detection value or the d-axis current detection value can be ignored.

In an electromotive power steering system according to an eighth aspect of the present invention, the abnormality judging unit judges that a system-control abnormality has occurred if a state in which the difference between the composed-vector command value and the composed-vector detection value is equal to or more than the predetermined value has continued for a period equal to or more than a predetermined period; thereby, errors such as noise generated in the q-axis current detection value or the d-axis current detection value can be ignored.

In an electromotive power steering system according to a ninth aspect of the present invention, application of current to the motor is shut off if the abnormality judging unit judges that a system-control abnormality has occurred; thereby, abnormal power-assisted steering can be prevented.

In an electromotive power steering system according to a tenth aspect of the present invention, the abnormality judgment is forbidden when the rotational speed of the motor is equal to or higher than a predetermined value; thereby, a wrong judgment due to the effect of induced voltages generated by the motor rotating can be prevented.

DETAILED DESCRIPTION OF THE PREFERRED EMBODIMENT

Figure 1:
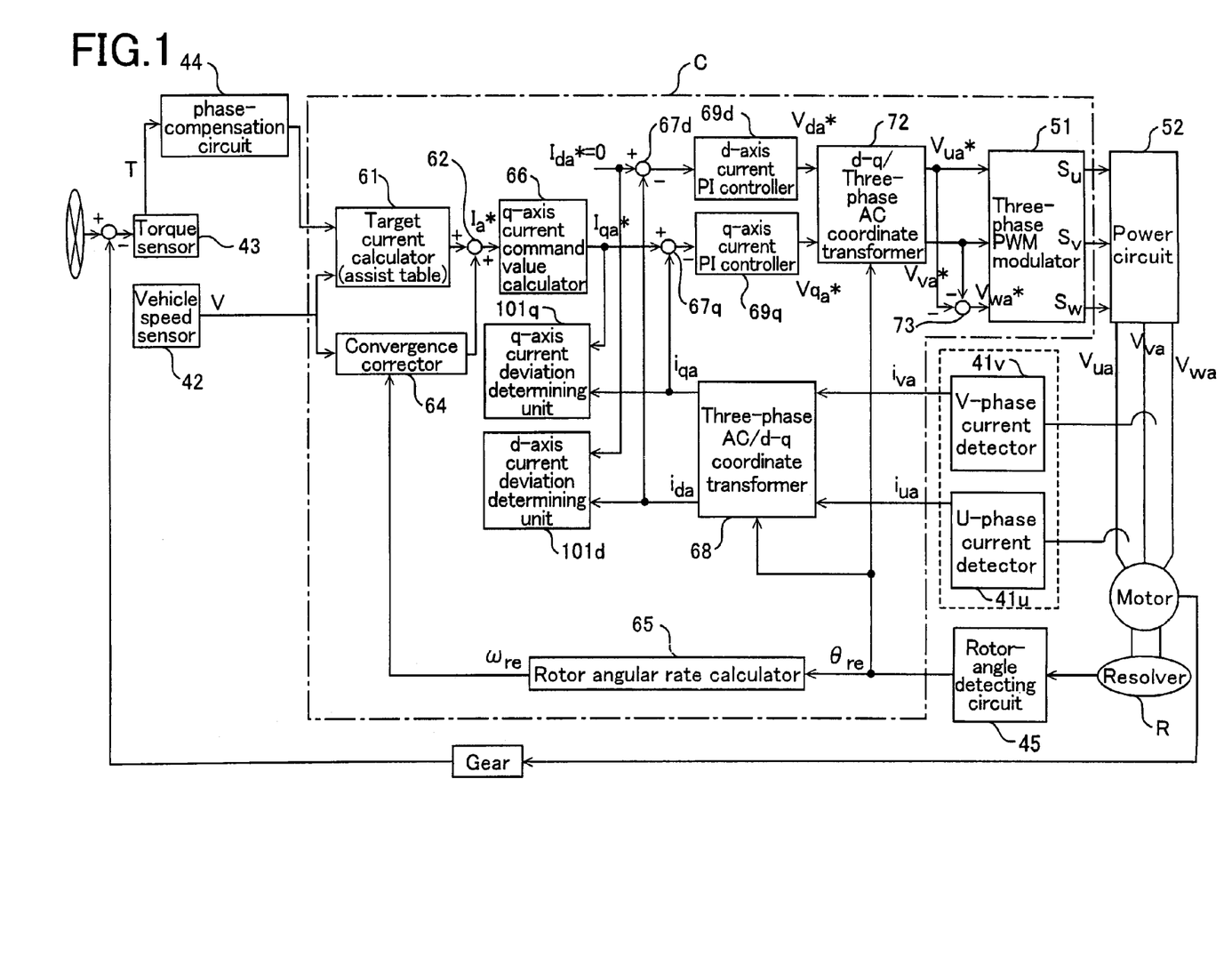
FIG. 1 is a block diagram illustrating a functional configuration of a motor controller used for an electromotive power steering system according to an embodiment of the present invention.

Hereinafter, an embodiment according to the present invention will be explained in detail. FIG. 1 is a block diagram for explaining a functional configuration of a motor M used for an electromotive power steering system according to the present invention. Here, blocks in FIG. 1 given the same numerals as those in FIG. 9 operate similarly to the blocks illustrated in FIG. 9; therefore, detailed explanations are omitted.

In this embodiment, in order to realize a means for determining whether a convergence-compensated target-current command value $I_a^*$ calculated by adding a target current command value $I_a^{*'}$ specified in a target current calculator 61 and a convergence compensation value $I_{co}^*$ is correctly applied the motor M, a d-axis current deviation determining unit 101d and a q-axis current deviation determining unit 101q are provided. A d-axis current command value $i_{da}^*$ and a d-axis current detection value $i_{da}$ obtained through a three-phase AC/d-q coordinate transformer 68 are inputted into the d-axis current deviation determining unit bid, and a q-axis current command value $i_{qa}^*$ and the q-axis current detection value $i_{qa}$ obtained through the three-phase AC/d-q coordinate transformer 68 are inputted into the q-axis current deviation determining unit 101q. In this manner, comparing both the inputted values, it is determined whether a system-control abnormality has occurred.

Hereinafter, the operation of the q-axis current deviation determining unit 101q is explained using from FIG. 2 to FIG. 5.

FIG. 2 to FIG. 5 illustrate relationships between the q-axis current command values and the q-axis current detection values and, corresponding to these relationships, variations of flags representing judging results of abnormalities in the motor controller. A predetermined allowable level $D_{qo}$ centering with the q-axis current command value is set, and when the q-axis current detection value $I_{qa}$ is within this allowable level, that is, when the following equation (3) is satisfied, the control system is determined to be in normal running state; as a result, the abnormality flag becomes "0".

$$i_{qa}^* - D_{qo} < i_{qa} < i_{qa}^* + D_{qo} \qquad (3)$$

Figure 2:
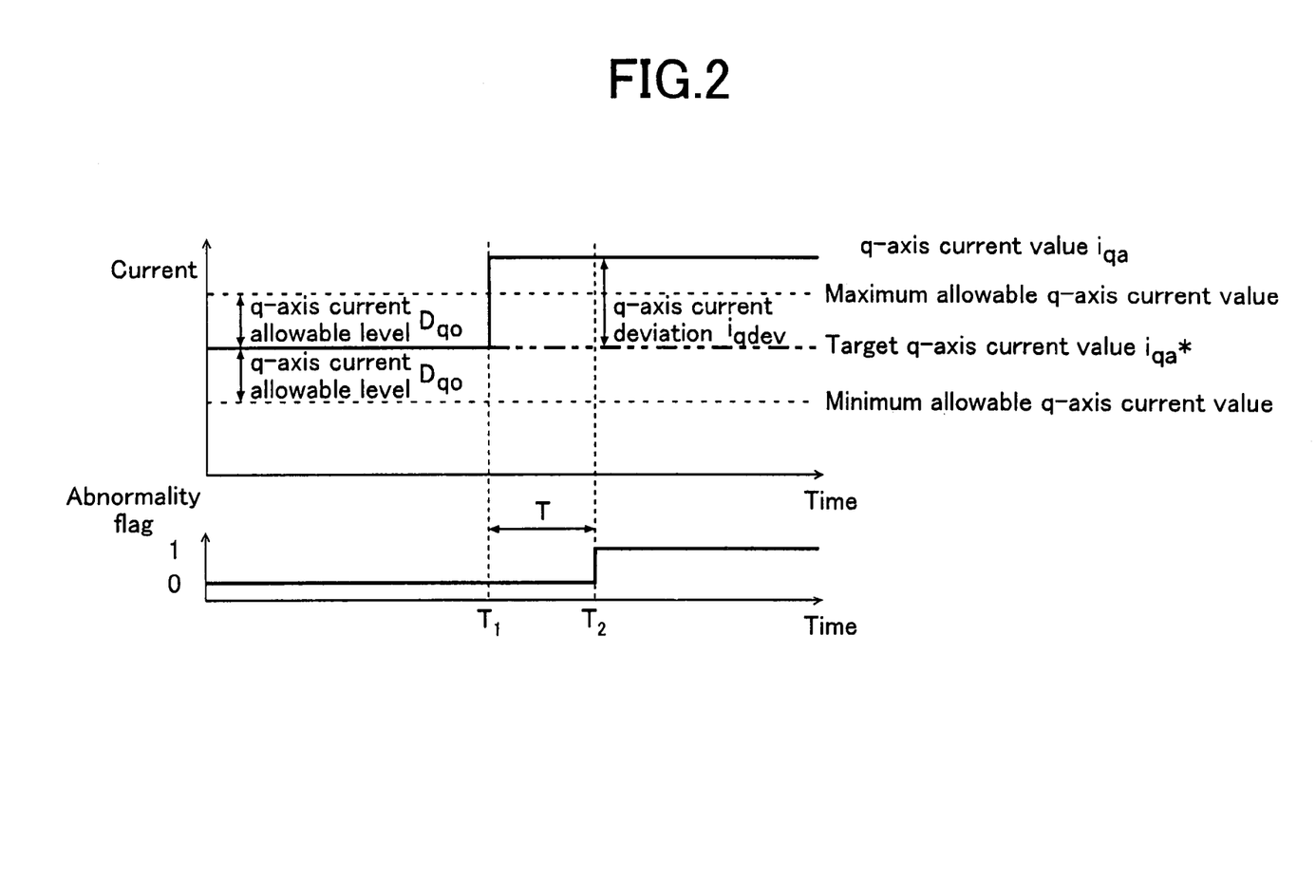
FIG. 2 is a timing chart illustrating a motor controller operation for the electromotive power steering system according to the embodiment of the present invention.
Figure 3:
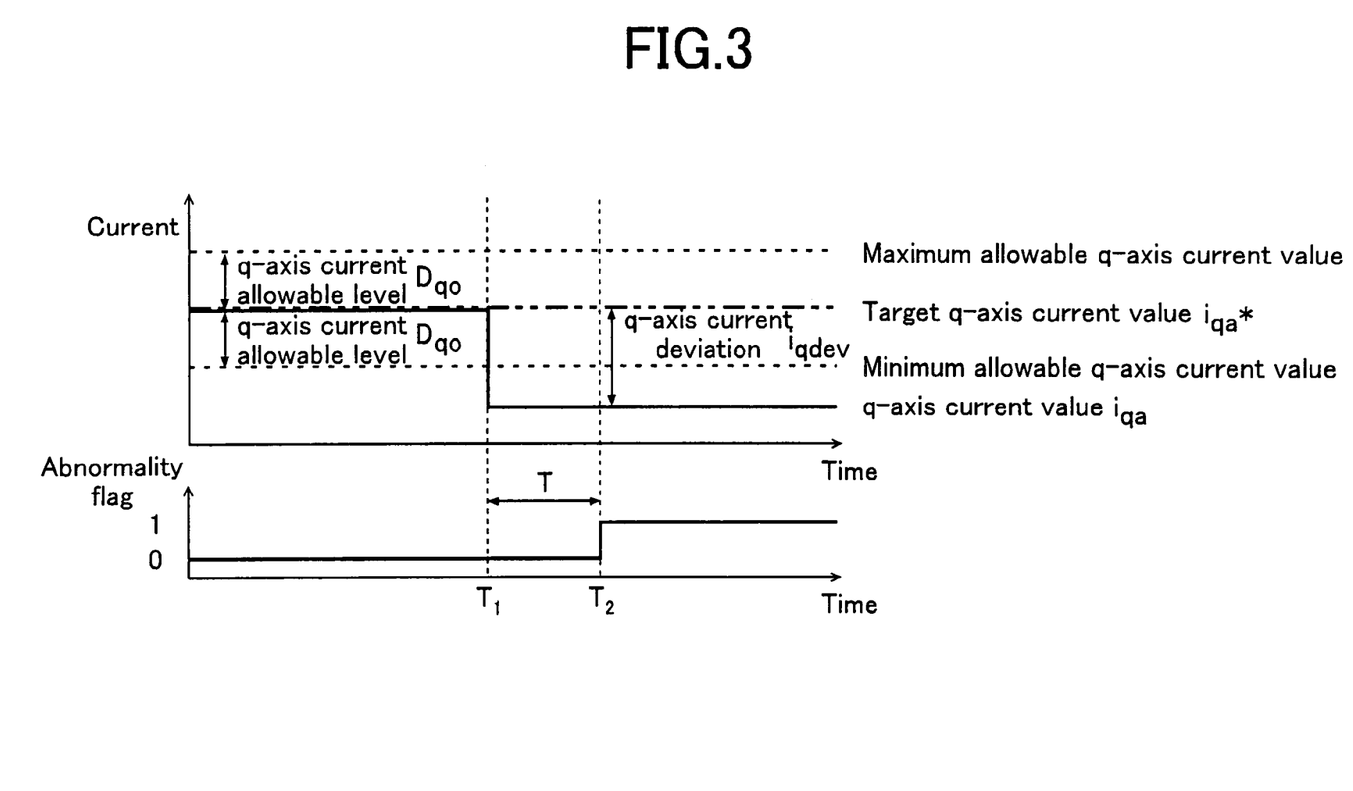
FIG. 3 is a timing chart illustrating a motor controller operation for the electromotive power steering system according to the embodiment of the present invention.

When a state, in which the above equation (3) is not satisfied, that is, in which the difference $i_{qdev}$ between the q-axis current command value and the q-axis current detection value exceeds the q-axis current allowable level $D_{qo}$, continues for a predetermined time T, the control system is determined to be abnormal, and the abnormality flag is set to be "1" (FIG. 2, FIG. 3).

Figure 4:
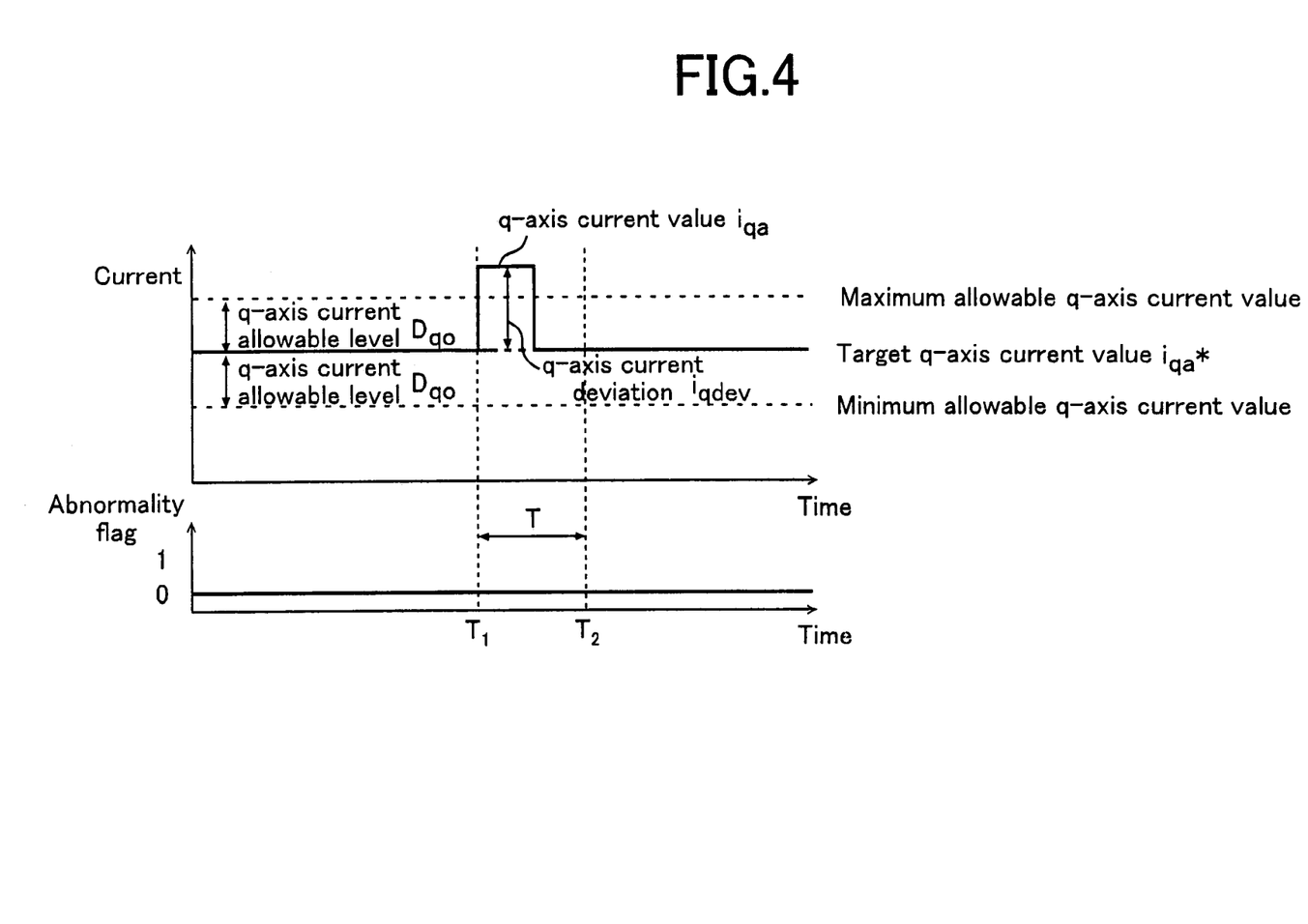
FIG. 4 is a timing chart illustrating a motor controller operation for the electromotive power steering system according to the embodiment of the present invention.
Figure 5:
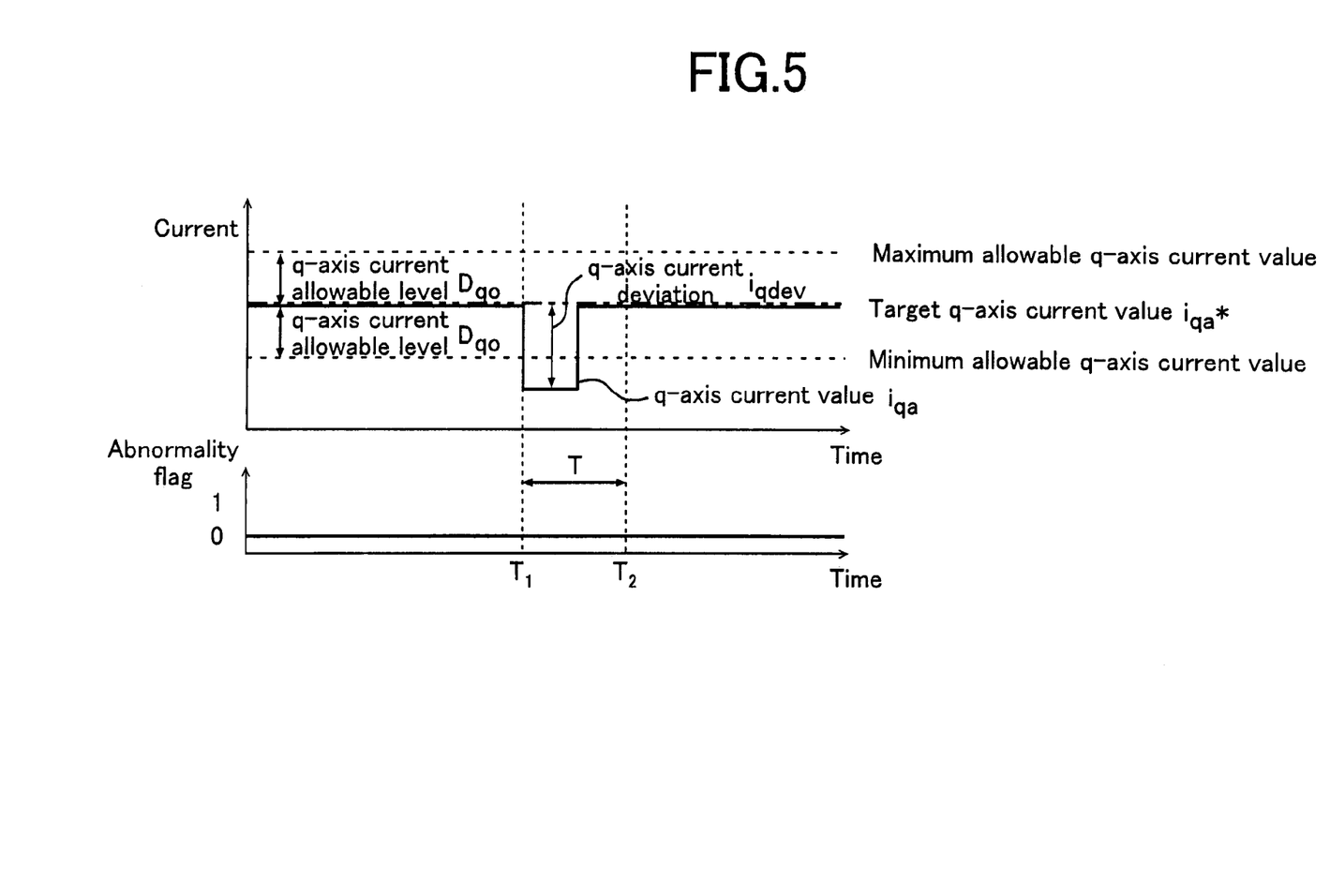
FIG. 5 is a timing chart illustrating a motor controller operation for the electromotive power steering system according to the embodiment of the present invention.

Even though the above equation is not satisfied, when the state does not continue for the predetermined time T, the control system is determined to be normal, and the abnormality flag becomes "0" (FIG. 4, FIG. 5).

When, by the above abnormality judging means, it is determined that a system-control abnormality has occurred, that is, when the abnormality flag is set to be "1", in order to prevent abnormal power-assisted steering, the application of current to the motor is shut off.

By determining that a system-control abnormality has occurred when a state in which the difference between the q-axis current command value and the q-axis current detection value exceeds the allowable level continues for the predetermined time, the control system is not determined to be abnormal, due to noise, etc., even in a case when the q-axis current detection value $i_{qa}$ instantaneously and widely fluctuates, and exceeds the allowable level; consequently, the motor controller can continue its normal operation.

Figure 6:
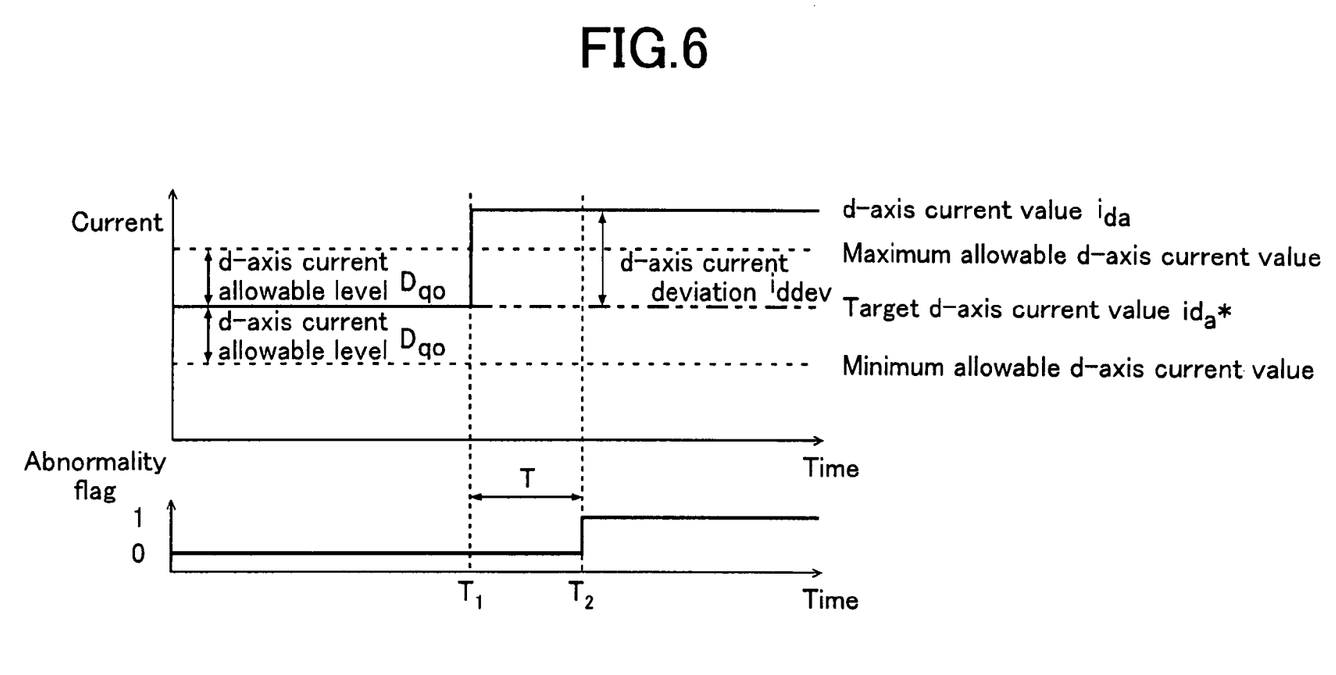
FIG. 6 is a timing chart illustrating a motor controller operation for the electromotive power steering system according to the embodiment of the present invention.

Fig 6 is a timing chart illustrating an abnormality judging operation using the d-axis current command value and the d-axis current detection value; however, because the operation is the same as that by the above described q-axis current, detailed explanation is omitted.

In the embodiment according to the present invention, although a case in which both the d-axis current deviation determining unit 101*d* and the q-axis current deviation determining unit 101*q* are provided has been explained, in order to simplify the abnormality determining means for the control system, it may be configured such that only the q-axis current deviation determining unit 101*q* is used, or only the d-axis current deviation determining unit 101*d* is used.

Moreover, in the above described embodiment, although a case in which the determination is performed independently, as to whether the difference between the q-axis current command value and the q-axis current detection value, or the difference between the d-axis current command value and the d-axis current detection value is within the allowable level, has been explained, it may be determined that an abnormality has occurred in the control system, using a composed-vector command value, which is the vector-composition from the q-axis current command value and the d-axis current command value, and a composed-vector detection value, which is the vector-composition from the q-axis current detection value and the d-axis current detection value.

In addition, even though the control system is in a normal state, a state in which the deviations for the q-axis or d-axis current command value and the q-axis or d-axis current detection value exceeds the allowable level, may occur due to the effect of induced voltages generated by the motor M rotation; however, a wrong judgment according to the effect of the induced voltages can be prevented if the system is configured so that the malfunction determination is forbidden when the rotational speed of the motor M is equal to or higher than a predetermined value.

Furthermore, in the above described embodiment, when any abnormality has been detected, the system has been controlled in order to shut off the application of current to the motor M by means of the power circuit 52 with the software installed in the microcontroller C; however, a switching means may be provided outside the power circuit 52 in order to shut off the application of the current to the motor M even when the power circuit 52 is in an abnormal state.

FIG. 7 is a circuit diagram for explaining an example of the present embodiment. Numeral 8 denotes a battery for supplying power to the electromotive power steering system; numeral 9 denotes a motor controller for the electromotive power steering system; and numeral 52 denotes the above described power circuit 52, which is configured of a pre-driver 52*a* for amplifying output currents from the microcontroller C, three-phase bridge circuits 52*b* including a power MOSFET (metal-oxide-semiconductor field effect transistor), and a condenser 52*c*. Numeral 11, which is a first switching means for connecting/disconnecting the battery 8 with/from the pre-driver 52*a*, includes a relay, numeral 10 is a second switching means for connecting/disconnecting the battery 8 with/from the three-phase bridge circuits 52*b*, and numeral 12 is a third switching means for connecting/disconnecting at least two of the phases in the motor M with/from the power circuit 52, and all of them are built in the motor controller 9. Here, the numerals given to the parts in this example are the same as those corresponding to the above described embodiment; therefore, their explanations are omitted.

In this example, when the microcontroller C detects any abnormality, the pre-driver 52*a* is driven in order to stop the driving of the motor M by means of the three-phase bridge circuit 52*b*, and the first to the third switching means are also shut off, then the driving of the motor M is stopped. Consequently, even when any abnormality is detected on the basis of a malfunction in the power circuit 52, the driving of the motor can be stopped without fail.

In addition, although the first to third switching means have been provided in this example, a similar effect can be obtained as long as one of them is provided.

What is claimed is:

1. An electromotive power steering system for performing power-assisted steering by applying to a steering mechanism torque generated by a motor, the system comprising:
    a d-q command value setting unit for determining, for current to be applied to the motor, d-axis and q-axis current command values in a d-q coordinate system;
    a current detector for detecting a three-phase AC current actually flowing in the motor;
    a three-phase AC/d-q coordinate transformer for transforming a three-phase AC current detected by the current detector into a d-axis current detection value and a q-axis current detection value in the d-q coordinate system;
    a voltage controller for controlling a voltage applied to the motor, based on the d-axis current command value and the q-axis current command value determined by the d-q command value setting unit, and on the d-axis current detection value and the q-axis current detection value outputted from the three-phase AC/d-q coordinate transformer; and
    an abnormality judging unit for judging, by either comparing the q-axis current command value with the q-axis current detection value, or comparing the d-axis current command value with the d-axis current detection value, whether a system-control abnormality has occurred.

2. An electromotive power steering system as recited in claim 1, wherein the abnormality judging unit judges that a system-control abnormality has occurred, if either the difference between the q-axis current command value and the q-axis current detection value is equal to or more than a first predetermined value, or the difference between the d-axis current command value and the d-axis current detection value is equal to or more than a second predetermined value.

3. An electromotive power steering system as recited in claim 1, wherein the abnormality judging unit judges that a system-control abnormality has occurred, if a state in which either the difference between the q-axis current command value and the q-axis current detection value is equal to or more than the first predetermined value or the difference between the d-axis current command value and the d-axis current detection value is equal to or more than the second predetermined value has continued for a period equal to or more than a predetermined period.

4. An electromotive power steering system as recited in claim 1, wherein application of current to the motor is shut off if the abnormality judging unit judges that a system-control abnormality has occurred.

5. An electromotive power steering system as recited in claim 1, wherein the abnormality judgment is forbidden when the rotational speed of the motor is equal to or higher than a predetermined value.

6. An electromotive power steering system for performing power-assisted steering by applying to a steering mechanism torque generated by a motor, the system comprising:
- a d-q command value setting unit for determining, for current to be applied to the motor, d-axis and q-axis current command values in a d-q coordinate system;
- a current detector for detecting a three-phase AC current actually flowing in the motor;
- a three-phase AC/d-q coordinate transformer for transforming a three-phase AC current detected by the current detector into a d-axis current detection value and a q-axis current detection value in the d-q coordinate system;
- a voltage controller for controlling a voltage applied to the motor, based on the d-axis current command value and the q-axis current command value determined by the d-q command value setting unit, and on the d-axis current detection value and the q-axis current detection value outputted from the three-phase AC/d-q coordinate transformer;
- a composed-vector command value calculator for calculating a composed-vector command value by the vector-composition of the q-axis current command value and the d-axis current command value;
- a composed-vector detection value calculator for calculating a detection value by the vector-composition of the q-axis current detection value and the d-axis current detection value; and
- an abnormality judging unit for judging, by comparing the composed-vector command value with the composed-vector detection value, whether a system-control abnormality has occurred.

7. An electromotive power steering system as recited in claim 6, wherein the abnormality judging unit judges that a system-control abnormality has occurred if the difference between the composed-vector command value and the composed-vector detection value is equal to or more than a predetermined value.

8. An electromotive power steering system as recited in claim 6, wherein the abnormality judging unit judges that a system-control abnormality has occurred if a state in which the difference between the composed-vector command value and the composed-vector detection value is equal to or more than the predetermined value has continued for a period equal to or more than a predetermined period.

9. An electromotive power steering system as recited in claim 6, wherein application of current to the motor is shut off if the abnormality judging unit judges that a system-control abnormality has occurred.

10. An electromotive power steering system as recited in claim 6, wherein the abnormality judgment is forbidden when the rotational speed of the motor is equal to or higher than a predetermined value.

* * * * *